Dec. 3, 1968

R. L. BROAD, JR 3,414,415

THAW INDICATOR

Filed Oct. 22, 1965

INVENTOR.

Robert L. Broad Jr.

ATTORNEY

INVENTOR.
Robert L. Broad Jr.
ATTORNEY

Patented Dec. 3, 1968

3,414,415
THAW INDICATOR
Robert L. Broad, Jr., 2209 Woodland St.,
Decatur, Ala. 35602
Continuation-in-part of applications Ser. No. 199,812,
June 4, 1962, and Ser. No. 267,743, Mar. 25, 1963.
This application Oct. 22, 1965, Ser. No. 501,724
12 Claims. (Cl. 99—192)

This application is a continuation-in-part consolidation of my applications Ser. No. 199,812, filed June 4, 1962, for "Thaw Indicator" and Ser. No. 267,743, filed Mar. 25, 1963, for "Indicating Device," Ser. No. 267,743 being a continuation-in-part of Ser. No. 199,812, both applications now abandoned.

This invention relates to thaw indicators and more particularly to devices for indicating that frozen foods have been exposed to elevated temperatures.

Under present market conditions the consumer has no way of knowing whether a frozen food has been thawed at one time or other in the past, since one cannot ascertain this fact merely by observing the food package. Quick-frozen food loses its quality and freshness when it is thawed and refrozen. If the thaw is great enough certain foods may even be dangerous after being thawed and refrozen. The consumer usually does not realize that the food has been thawed excessively until it is consumed.

Several types of thaw indicators are known. Most of these are subject to disadvantages which make them impractical or difficult to use. Some of these indicators cannot be stored at room temperature. Others are complex and expensive while others verge on inoperativeness as far as practical use is concerned. Most of the known thaw indicators merely show that a thaw has occurred and cannot indicate the duration of the thaw. With this in mind, one of the objects of this invention is to provide a novel and improved thaw indicator.

Another object of this invention is to provide a device for indicating whether a refrigerated material has been subjected to an excessive temperature.

Still another object of this invention is to provide an indicator which indicates both that an excessive temperature has been reached and the duration of the excessive temperature.

A still further object of this invention is to provide a thaw indicator which is inexpensive and easy to manufacture in great volume.

Yet another object of this invention is to provide a thaw indicator which will indicate the total time duration of more than one period of excessive temperatures.

Still another object of this invention is to provide a thaw indicator which will indicate the total heat input to a package of frozen food.

Another object of this invention is to provide a thaw indicator which can be made as an integral part of a food container.

A further object of this invention is to provide a thaw indicator wherein a small capillary element meters a diffusion agent to a large capillary element to control the migration rate of the agent along the large capillary element.

One embodiment of the present invention contemplates a thaw indicator wherein a large capillary element is connected by a small capillary element to a source of a diffusion agent which is capable of diffusion only at temperatures above the uppermost temperature of the range in which a frozen food is to be maintained. If a thawing temperature is reached, the diffusion agent will migrate along the small capillary element to the large capillary element. The purpose of the small capillary element is to meter the diffusion agent to the large capillary element at a precisely controlled rate to precisely control the movement of the agent along the large capillary element. The distance that the agent travels along the large capillary element is proportional to the duration of the thaw. The large capillary element may be provided with a scale so that the ultimate consumer can read the duration of the thaw directly off the indicator.

In greater detail, one embodiment of the invention may comprise an elongated strip of blotting paper connected to or positioned on a thin strip of porous paper leading to a capsule containing a salt solution and a dye, the capsule being adapted to rupture when the solution expands on freezing. If the melting point of the solution is reached, the solution is freed to flow along the thin paper strip to the blotting paper. The distance that the solution travels along the blotting paper is proportional to the time interval during which the thaw temperature is exceeded, a scale being provided on the blotting paper so that the consumer can note this time interval.

Other objects and advantages of the invention will become apparent when the following detailed description is read in conjunction with the appended drawings, in which FIGURE 1 is a plan view of the thaw indicator of the present invention showing the relative positioning of the diffusion agent and the capillary elements;

Figure 1:
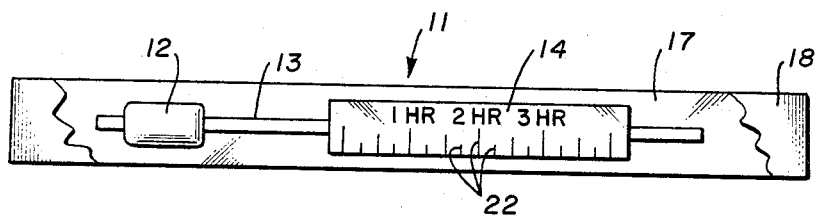

Referring now in detail to the drawings, there is shown a thaw indicator 11 having a glass capsule 12, a "metering" strip or portion 13 and an "indicating" strip or portion 14 connected together in series in the order enumerated. The glass capsule 12 contains a diffusion agent, such as a salt solution and a dye, which is adapted to migrate by capillary action or diffusion along the metering strip 13 to the indicating strip 14. The metering strip 13 may be made of a porous paper such as newsprint, while the indicating portion 14 may be made of a porous paper such as ordinary blotting paper. These elements are positioned between a pair of elongated enclosure strips 17 and 18 made of an impervious material such as polyethylene, the enclosure strips 17 and 18 being sealed together in such a manner that migration of the diffusion agent from the capsule 12 to the indicating strip 14 takes place only through the metering strip 13.

In operation, the thaw indicator is attached in any convenient manner to a container 19 of frozen food prior to the freezing of the food. Upon freezing, the solution will expand and rupture the frangible capsule 12. The solution is adapted to be capable of diffusion or capillary flow only at temperatures above a predetermined thaw temperature. So long as the food package temperature remains below that predetermined thaw temperature the solution remains frozen in the broken capsule 12.

In the event that the food package is exposed to a thawing temperature the solution will become capable of capillary flow and will migrate along the metering strip 13 to the indicating strip 14. The capillary capabilities of the metering strip 13 and the indicating strip 14 are precisely adjusted relative to each other so that the metering strip meters the flow of the solution to the indicating strip at a slow and precisely controlled rate. Thus, the distance travelled by the solution along the indicating portion 14 is directly proportional to the duration of the thaw.

The term "thaw" as used herein does not refer to an actual thaw of the food but refers to the subjection of the food to an excessively high temperature which may lead to a thawing of the food or to a loss of the food's quality or freshness. The indicating portion 14 is provided with a scale 22 to indicate the duration of the thaw. Thus, the ultimate consumer can readily determine the total time duration of the thaw or thaws merely by noting how far the solution has travelled relative to the scale 22. The indicator may also be marked so that the consumer, by noting the distance travelled by the diffusion agent, will know whether the food has lost its quality and freshness and/or whether the food is unsafe for consumption.

Upon lowering the temperature of the food package to a point below the thaw temperature, the solution will freeze in the indicating strip 14 and cease to flow. If another thaw should occur, the solution will again advance along the indicating portion 14 at a slow and uniform (from indicator to indicator) rate until the thaw ends. Cumulative thaw time can be read directly off the scale 22.

If the diffusion agent used has a viscosity which decreases with increases in temperature, the distance travelled by the diffusion agent along the indicating portion 14 can be used to indicate the total heat input to the food in the package. In using such a diffusion agent, higher temperatures (which result in greater heat input to the food) cause the viscosity of the solution to drop so that the solution flows along the indicating strip 14 at a faster rate. The distance travelled by the diffusion agent will thus depend on both temperature and time. This distance will indicate, when the proper diffusion agent is used, an integration of the time-temperature curve, thereby giving the total heat input to the food. Organic solutions have variable viscosities and freezing points both well above and well below the freezing point of water are well known.

If a thick paper such as blotting paper is used for the metering strip 13 it may be difficult to seal the enclosure strips 17 and 18 around the metering strip so as to eliminate crevices extending along the edges of the strip 13 from the fluid supply to the indicating strip 14. This difficulty can be overcome by using the embodiment illustrated in FIGURE 3.

Figure 3:
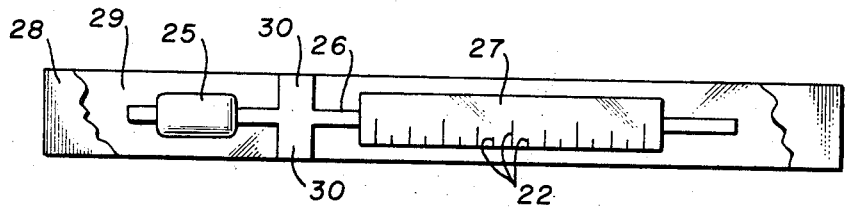
FIGURE 3 is a plan view showing an embodiment of the invention which may be used when it is desired to use a thick paper for the smaller capillary element.

The embodiment of FIGURE 3 includes a fluid supply 25, a metering strip 26 made of porous paper and indicating strip 27 made of porous paper, all of these elements being sandwiched between a pair of enclosure strips 28 and 29. To prevent the possibility of the existence of any crevices leading from the fluid supply 25 to the indicating strip 27, the metering strip 26 is provided with an enlarged or widened portion 30 which extends the width of the enclosure strips 28 and 29. The use of the enlarged portion 30 completely eliminates the possibility of having any crevices leading from the fluid supply 25 to the indicating strip 27. It is desirable to eliminate all crevices leading from the supply of diffusion agent to the indicating portion (unless the crevices are made uniform from indicator to indicator), since seepage of the diffusion agent through these crevices would tend to make the indicator erratic. These crevices normally do not occur when a fairly thin paper is used for the metering portion.

Figure 4:
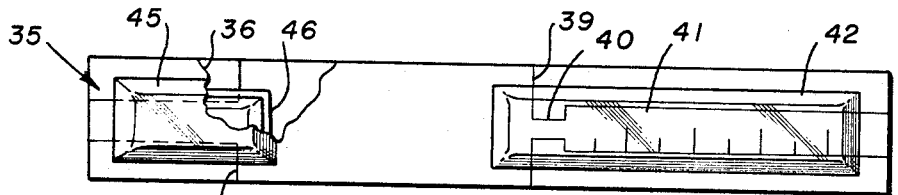
FIGURE 4 is a plan view of a preferred embodiment of the invention.
Figure 5:
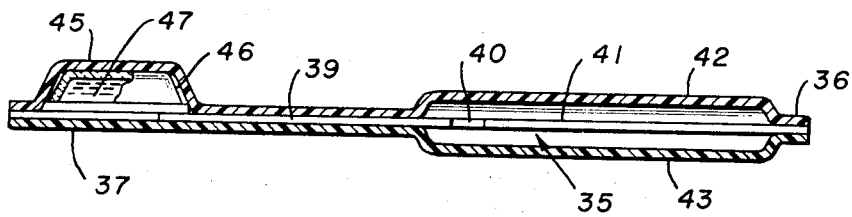
FIGURE 5 is a side view of the embodiment of FIGURE 4.

FIGURES 4 and 5 illustrate a preferred embodiment of the invention. In this embodiment a capillary element 35 is sandwiched between a pair of enclosure strips 36 and 37 which may be made from a suitable plastic material. The capillary element 35 is provided with an enlarged portion 39, a metering portion 40 and an indicating portion 41 connected together in series in the order enumerated. The enclosure elements 36 and 37 are provided with molded cavity portions 42 and 43, respectively, which are positioned in facing relationship to each other to form an elongated chamber surrounding the metering and indicating portions 40 and 41. Since the enlarged portion 39 and the remote end of the indicating portion 41 ar held by the enclosure strips 36 and 37, the metering and indicating portions 40 and 41 are held suspended in the elongated chamber out of contact with the walls thereof. The enclosure element 36 is also provided with a second molded cavity portion 45 which is spaced longitudinally from the cavity portion 42, the cavity portion 45 enclosing a glass capsule 46 which is filled with a suitable diffusion agent.

Figure 2:
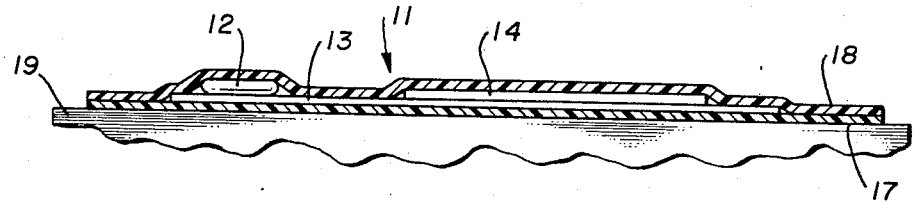
FIGURE 2 is a longitudinal cross sectional view of the device of FIGURE 1.

The operation of the embodiment disclosed in FIGURES 4 and 5 is identical to the operation of the embodiment disclosed in FIGURES 1 and 2. Inasmuch as the enlarged portion 39 completely fills the opening between the two chambers (which opening is defined by the inner surfaces of the enclosure elements 36 and 37) no crevices leading from the fluid supply to the elongated chamber can exist.

The use of the cavity portions 42 and 43 is a safety feature which is useful in the event of damage to the indicator which results in leakage of the diffusion agent past the enlarged portion 39. Since the walls of the cavity portions 42 and 43 are spaced from each other and from the capillary element 35, any excess fluid in the end of the elongated chamber adjacent to the enlarged portion 39 will remain at that point.

Figure 6:
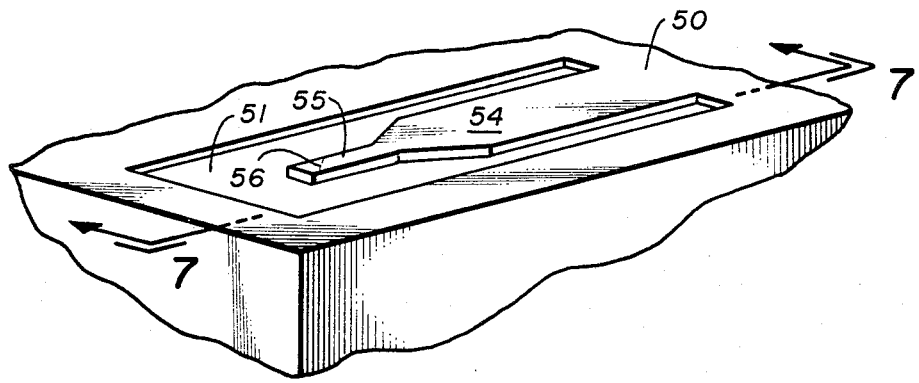
FIGURE 6 is a fragmentary view showing an embodiment of the invention which can be made as an integral part of a food container.
Figure 7:
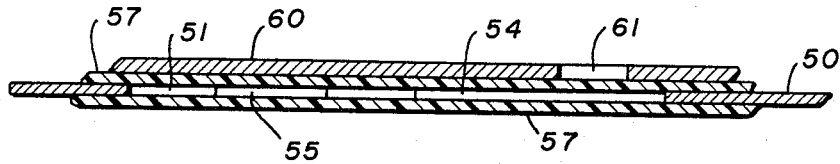
FIGURE 7 is a cross sectional view taken on line 7—7 of FIGURE 6.

FIGURES 6 and 7 show an embodiment of the invention which can be made as an integral part of the container in which the food is packaged, such a container normally being made of a porous carboard. In this embodiment one wall of a food container 50 is cut or punched to form therein an opening 51 having the configuration illustrated in FIGURE 6. It will be noted that the opening 51 is elongated and that an elongated portion of the container wall extends into the opening 51. This elongated portion includes a wide indicating portion 54 having on the end thereof a narrow metering portion 55 which terminates in a free end.

A pair of impervious sheets 57 of thin polyethylene are heat sealed to the container wall on opposite sides thereof to enclose the opening 51 and thereby form a fluid chamber. In order to prevent loss of the fluid from the chamber the entire wall of the opening 51 is treated with a suitable waterproofing agent. The end of the metering portion 55 is then severed along dotted line 56 so as to expose the end wall of the metering portion 55 to the fluid in the chamber formed by the opening 51. The waterproofing of the walls of the opening 51 and the severing of the metering portion 55 are both done prior to the addition of the sheets 57. The conventional paper wrapper 60 on the container 50 is provided with a window 61 through which the consumer can observe the end of the indicating portion 54. Of course, the portions 54 and 55 may be made of a material different from the container 50. In this case, the opening 51 will be rectangular in configuration and the element making up the portions 54 and 55 will be held in the proper place by being heat sealed to the sheets 57.

After the food has been enclosed in the container 50 and just prior to the freezing operation a suitable diffusion agent is injected into the opening 51 in any convenient manner. The quick freezing of the food will prevent any substantial migration of the diffusion agent into the metering portion 55. In the event of a subsequent thaw, this embodiment operates in the same manner as the other embodiments.

Figure 8:
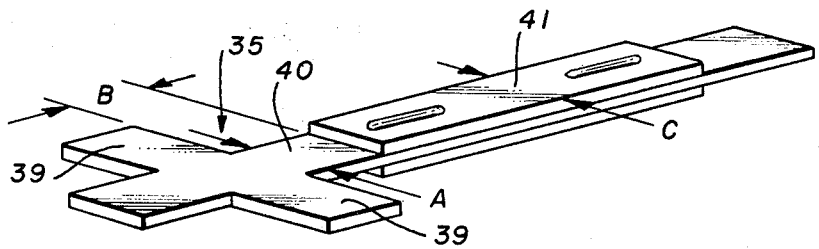
FIGURE 8 is a perspective view of the capillary elements showing dimensions referred to in the examples.

FIGURE 8 shows a capillary element similar to that shown in FIGURES 4 and 5 with the exception that the increased capillary capability of the indicating portion is achieved by stapling a pair of porous strips to the strip which forms the metering strip. The dimensions A, B and C are shown for use in connection with the examples.

In making the runs illustrated by the examples which follow, an enclosure construction such as that shown in FIGURES 4 and 5 was used. FIGURE 8 illustrates the type of capillary element used in making these runs. The diffusion agent was applied to the enlarged portion 39 and the distance of migration of the diffusion agent along the indicating portion was measured at timed intervals. These distances, which were measured to the nearest 1/32", are shown in the tables. For example, the diffusion agent in sample A1 migrated 49/32" (or 1 17/32") in 150 minutes. The time shown in the tables is in minutes.

EXAMPLE I

Four samples were tested simultaneously at a temperature of about 80–85° F. The metering portion was made of newsprint. The indicating portion was made of blotting paper, a double layer being used. Dimensions (refer to FIGURE 8) were: A—7/16"; B—1/2"; C—1/2". Diffusion agent: water. The results are shown in Table 1.

TABLE 1

| Time | 30 | 60 | 90 | 120 | 150 | 180 |
|---|---|---|---|---|---|---|
| Samples: | | | | | | |
| A1 | 11 | 27 | 36 | 45 | 49 | 54 |
| A2 | 14 | 29 | 39 | 46 | 52 | 56 |
| A3 | 12 | 26 | 38 | 45 | 51 | 55 |
| A4 | 10 | 25 | 35 | 44 | 48 | 54 |

EXAMPLE II

Example I was repeated at a temperature of about 60° F. Results are shown in Table 2.

TABLE 2

| Time | 60 | 120 | 180 | 240 | 300 | 360 |
|---|---|---|---|---|---|---|
| Samples: | | | | | | |
| B1 | 10 | 19 | 26 | 33 | 40 | 47 |
| B2 | 11 | 20 | 28 | 35 | 43 | 49 |
| B3 | 14 | 23 | 29 | 35 | 42 | 50 |
| B4 | 9 | 19 | 25 | 32 | 39 | 45 |

EXAMPLE III

Four samples were tested simultaneously at about 80–85° F. Metering portion: filter paper. Indicating portion: double layer of blotting paper. Diffusion agent: water. Dimensions: A—1/2"; B—1/2"; C—1/2". Results are shown in Table 3.

TABLE 3

| Time | 5 | 10 | 15 | 20 | 25 |
|---|---|---|---|---|---|
| Samples: | | | | | |
| C1 | 15 | 24 | 35 | 45 | 53 |
| C2 | 13 | 24 | 35 | 48 | 55 |
| C3 | 15 | 27 | 38 | 49 | 57 |
| C4 | 15 | 27 | 40 | 49 | 56 |

EXAMPLE IV

Example III was repeated under the same conditions with the exception that dimension A was reduced to 3/32". Results are shown in Table 4.

TABLE 4

| Time | 30 | 60 | 90 | 120 | 150 |
|---|---|---|---|---|---|
| Samples: | | | | | |
| D1 | 13 | 28 | 41 | 51 | 59 |
| D2 | 13 | 26 | 39 | 50 | 58 |
| D3 | 13 | 26 | 39 | 50 | 59 |
| D4 | 13 | 28 | 42 | 53 | 61 |

EXAMPLE V

Four samples were tested simultaneously at about 70–75° F. Metering portion: chromotography paper. Indicating portion: double layer of blotting paper. Dimensions: A—5/32"; B—1/2"; C—1/4". Diffusion agent: 1/3 glycerin—2/3 water, by volume. Results are shown in Table 5.

TABLE 5

| Time | 30 | 60 | 90 | 120 | 150 |
|---|---|---|---|---|---|
| Samples: | | | | | |
| E1 | 9 | 21 | 31 | 38 | 45 |
| E2 | 12 | 23 | 31 | 38 | 44 |
| E3 | 9 | 20 | 29 | 37 | 43 |
| E4 | 13 | 26 | 35 | 42 | 48 |

EXAMPLE VI

Four samples were tested simultaneously at about 80–85° F. Both the metering and indicating portions were made from blotting paper, the latter portion being a triple layer (including the metering portion which was extended along the indicating portion). The diffusion agent used was 1/3 glycerin—2/3 water, by volume. Dimensions: A—5/32"; B—1/2"; C—1/2". Results are shown in Table 6.

TABLE 6

| Time | 30 | 60 | 75 |
|---|---|---|---|
| Samples: | | | |
| F1 | 25 | 46 | 56 |
| F2 | 24 | 44 | 53 |
| F3 | 22 | 41 | 51 |
| F4 | 23 | 42 | 52 |

EXAMPLE VII

Example VI was repeated at about 65–70° F. Results are shown in Table 7.

TABLE 7

| Time | 30 | 60 | 90 | 120 |
|---|---|---|---|---|
| Samples: | | | | |
| G1 | 18 | 34 | 48 | 59 |
| G2 | 19 | 36 | 52 | 63 |
| G3 | 19 | 35 | 49 | 61 |
| G4 | 19 | 35 | 50 | 62 |

EXAMPLE VIII

Example VI was repeated at about 45–50° F. Results are shown in Table 8.

TABLE 8

| Time | 30 | 60 | 90 | 120 | 150 | 180 |
|---|---|---|---|---|---|---|
| Samples: | | | | | | |
| H1 | 14 | 24 | 33 | 43 | 53 | 60 |
| H2 | 16 | 27 | 36 | 44 | 52 | 60 |
| H3 | 14 | 23 | 34 | 40 | 49 | 57 |
| H4 | 13 | 23 | 33 | 40 | 50 | 58 |

EXAMPLE IX

Example VI was repeated at about 25–30° F. Results are shown in Table 9.

TABLE 9

| Time | 60 | 120 | 180 | 240 | 300 |
|---|---|---|---|---|---|
| Samples: | | | | | |
| J1 | 21 | 41 | 51 | 58 | 64 |
| J2 | 21 | 40 | 51 | 58 | 64 |
| J3 | 20 | 39 | 49 | 58 | 64 |
| J4 | 20 | 39 | 47 | 57 | 63 |

The above examples illustrate the versatility of this thaw indicator. While these examples cover thaw periods of from a few minutes to several hours, the indicator can be made in such a manner that it will monitor thaw periods up to several days in duration. For example, a test was made using a No. 60 cotton sewing thread as the metering portion, the thread being first washed to remove sizing. A pair of strips of blotting paper 1/2" in width, were positioned on opposite sides of the thread and stapled together. The end of the thread was placed in a pool of a diffusion agent made up of 1/3 glycerin—2/3 water by volume, the pool being positioned about 1/2" from the blotting strips. At a temperature of about 75–70° F. the fluid migrated along the blotting strips a distance of 48/32" (1 1/2") in 58 hours.

The migration rate along the indicating portion can be adjusted to a precise, desired value by adjusting the relative capillary or diffusion capabilities of the metering and indicating portions. Different capillary capabilities can be achieved in a strip of uniform width by impregnating portions of the strip with wax or some other suitable material, or by other methods. Different diffusion capabilities can also be achieved by using different materials for the capillary elements and by adjusting the cross sectional areas of the different materials. By the proper selection of materials and cross sections, almost any ratio of capillary capabilities can be achieved.

A major purpose of using the two different capillary capabilities is to slow the migration rate along the indicating portion. Without the reduced capillary capability of the metering portion the diffusion agent would travel along the indicating portion at a rate which would be much too high (thereby requiring an indicating portion too long to be practical). Also, a large quantity of diffusion agent would be needed. By using the reduced capillary capability of the metering portion of the present invention, the diffusion agent migrates along the indicating portion at a very slow rate (which rate decreases, as the examples will show, as the diffusion agent approaches the remote end of the indicating portion). Also, only a few drops of diffusion agent are needed.

While the use of a frangible capsule is disclosed in some of the embodiments, this capsule is not absolutely necessary. It will be preferred in many cases to eliminate the cost of the capsule. This can be achieved by having the food packager inject the diffusion agent into the indicator just prior to the freezing of the food (as is the manner disclosed in connection with the embodiment of FIGURES 6 and 7).

If the indicating portion is of a color other than white, the progress of a liquid diffusion agent along the indicating portion will be evidenced by a darkening of the indicating portion, so that it is not necessary to use a dye or coloring agent with the diffusion agent. Color changes in the indicating portion can also be effected by other known methods when either liquid or other diffusion agents are used.

The indicator of the present invention is inexpensive and easy to manufacture in great volume. The indicators can be made in the form of a continuous strip which can be wound into a roll for storage and shipment, the user merely severing the strip to separate the indicators.

It is to be understood that the embodiments disclosed herein are merely illustrative and that these embodiments can be altered or amended and that numerous other embodiments can be contemplated without departing from the spirit and scope of the invention.

What is claimed is:

1. A thaw indicator; comprising capillary means having first and second portions connected in series; said first portion having a first, precisely adjusted capillary capability; said second portion having a second, precisely adjusted capillary capability greater than said first capillary capability; said first and second capillary capabilities being precisely adjusted relative to each other so that when a diffusion agent is fed into said capillary means through the first portion thereof the migration rate of the agent along the second portion is a predetermined and precisely adjusted fraction of the migration rate along said first portion; a diffusion agent in contact with said first portion; and an enclosure surrounding the first and second portions in such a manner as to allow migration of the diffusion agent through the first portion to the second portion.

2. A thaw indicator; comprising capillary means having a first portion connected in series to a second portion; said first portion having a first, precisely adjusted cross-sectional area; said second portion having a second, precisely adjusted cross sectional area greater than said first cross sectional area; a diffusion agent in contact with said first portion; said agent being incapable of diffusion below a predetermined temperature; said first and second cross sectional areas being precisely adjusted relative to each other so that the rate of migration of the agent along the second portion is a predetermined and precisely adjusted fraction of the migration rate along the first portion; and means enclosing the diffusion agent and said capillary means in such a manner that migration of the agent to the second portion other than through the first portion is prevented.

3. A thaw indicator, comprising a source of fluid, said fluid having a solidifying point such that the fluid is incapable of capillary flow below a predetermined temperature, first means leading from the fluid source and having a predetermined capillary capability, second means leading from the first means and having a capillary capability greater than said predetermined capability, and an enclosure surrounding the first and second means in such a manner as to allow migration of the fluid through the first means to the second means.

4. A thaw indicator, comprising an elongated enclosure having a pair of spaced chambers, means defining a capillary passageway interconnecting the chambers, said capillary passageway having a predetermined capillary capability, and a capillary element positioned in one of the chambers in communication with said passageway, said capillary element having a capillary capability greater than said predetermined capability, and a diffusion agent in the other of said chambers in communication with said capillary passageway said diffusion agent being capable of capillary flow at temperatures above a predetermined temperature.

5. A thaw indicator, comprising enclosure means forming a pair of chambers, means defining a capillary passageway interconnecting the chambers, said capillary passageway having a predetermined capillary capability, a capillary element positioned in one of the chambers in communication with the capillary passageway, said capillary element having a capillary capability greater than said predetermined capillary capability, and a supply of a diffusion agent in the other of said chambers in communication with said capillary passageway, said diffusion agent being incapable of capillary flow below a predetermined temperature, said diffusion agent also having a viscosity which decreases with increases in temperature.

6. A thaw indicator, comprising an elongated strip of porous paper having a predetermined first capillary capability, a second elongated strip of porous paper positioned in series with the first strip and having a predetermined second capillary capability, a frangible capsule positioned on said first strip at a predetermined distance from said second strip, said capsule containing a diffusion agent which is incapable of diffusion through the paper strip at temperatures below a predetermined thaw temperature, said second capillary capability being greater than said first capillary capability, said capillary capabilities being adjusted relative to each other in such a manner that the migration rate of the diffusion agent along the second paper strip is a predetermined and precisely adjusted fraction of the migration rate along the first paper strip, and a pair of elongated enclosure strips positioned on opposite sides of the paper strips and the capsule, said enclosure strips being secured to each other in such a manner that migration of the diffusion agent to the second paper strip can take place only through the first paper strip.

7. A thaw indicator, comprising a pair of elongated enclosure strips positioned in facing relationship, said strips defining a pair of chambers longitudinally spaced from each other, a porous paper metering strip positioned between the enclosure strips and extending therealong to interconnect the chambers, said enclosure strips being sealed together to enclosure the metering strip therebetween, said metering strip having a predetermined capillary capability, a porous paper indicating strip positioned in one of the chambers in contact with the metering strip, said indicating strip having a capillary capability greater than said predetermined capability, and a source of fluid in the other chamber, said fluid being incapable of diffusion through the paper strips at temperatures below a predetermined thaw temperature, said metering strip having a widened portion positioned between the chambers, said widened portion extending to the edges of the enclosure strips.

8. A thaw indicator, comprising a first strip of porous paper, a pair of enclosure strips positioned on opposite sides of the paper strip and secured thereto, said enclosure strips having therein elongated cavity portions in facing relationship to form an elongated chamber having the walls thereof spaced from the paper strip, at least one of said enclosure strips having another cavity portion forming a second chamber spaced longitudinally from the elongated chamber, a supply of fluid in the second chamber, said fluid being incapable of capillary flow below a predetermined temperature, said paper strip having a widened portion positioned between said chambers, said widened portion being equal in width to the enclosure strips, said paper strip having a narrow metering portion positioned in the end of the elongated chamber adjacent to said widened portion, and second elongated strip of porous paper positioned in contact with the first strip to form an indicating portion, said second paper strip being spaced from said end of the chamber so as to be connected in series with said metering portion.

9. A thaw indicator, comprising an elongated chamber having in one end thereof an inlet opening, an elongated capillary element positioned in the chamber and having a first portion extending into said inlet opening, said element being attached by the ends thereof to the ends of the chamber so as to be suspended in the chamber out of contact with the walls thereof, said element also having second and third portions connected in series to the first portion, said second portion having a capillary capability less than said first and third portions, and a diffusion agent in contact with the first portion for migration through said first portion to the second and third portions.

10. A thaw indicator, comprising a sheet of porous paper, said sheet having therein an opening, said opening having a configuration such that an elongated portion of said sheet extends into and has a free end positioned in said opening to form an indicating portion, said indicating portion having on the free end thereof a metering portion, said metering portion having a capillary capability less than the capillary capability of the indicating portion, means enclosing the sheet to thereby enclose the opening to form a chamber, and a diffusion agent in the chamber, the free end of the metering portion being exposed to the diffusion agent in the chamber, the remainder of the wall of said opening being impervious to said diffusion agent.

11. A thaw indicator, comprising a sheet of porous paper having therein an opening, a pair of impervious sheets secured to the paper sheet on opposite sides thereof to enclose the opening and thereby form a chamber, a diffusion agent in said chamber, said diffusion agent being in contact with said opening, a portion of the wall of the opening being pervious to said agent for metering the diffusion agent from the chamber into the paper sheet at a predetermined and precisely adjusted rate, the remainder of said wall being impervious to said agent, said paper sheet having an indicating portion extending away from the metering portion, said indicating portion having a capillary capability greater than the capillary capability of said metering portion, said capillary capabilities being adjusted relative to each other in such a manner that the migration rate of the diffusion agent through the indicating portion is a precisely adjusted fraction of the migration rate of the diffusion agent through the metering portion.

12. A thaw indicator, comprising a flat sheet of porous cardboard having an aperture therein, said aperture having a configuration such that an elongated portion of said sheet extends into said aperture, said portion having a predetermined capillary capability, said portion having on the end thereof a metering portion having a capillary capability less than said predetermined capillary capability, said metering portion terminating in a free end, said metering portion being adapted to meter a fluid to the elongated portion at a precise and controlled rate, a pair of impervious sheets secured to the porous sheet on opposite sides thereof to enclose the aperture and thereby form a chamber, and a fluid in the chamber, said fluid being incapable of diffusion through the cardboard sheet at temperatures below a predetermined thaw temperature, the wall of the free end of the metering portion being exposed to the fluid, the remainder of the wall of the aperture being covered with a waterproofing agent to prevent movement of the fluid into the porous sheet except through said exposed end of said metering strip.

References Cited

UNITED STATES PATENTS

| | | | |
|---|---|---|---|
| 1,535,536 | 4/1925 | MacDonald | 116—114.5 X |
| 2,490,933 | 12/1949 | Tournquist et al. | 99—192 |
| 2,560,537 | 7/1951 | Andersen | 99—192 |
| 2,847,067 | 8/1958 | Brewer. | |
| 2,850,393 | 9/1958 | Romito | 99—192 |
| 3,243,303 | 3/1966 | Johnson | 99—192 |

A. LOUIS MONACELL, *Primary Examiner.*

J. M. HUNTER, *Assistant Examiner.*